US007735631B2

(12) United States Patent
Berdelle-Hilge

(10) Patent No.: US 7,735,631 B2
(45) Date of Patent: Jun. 15, 2010

(54) MAIL PROCESSING SYSTEM AND METHOD OF DELIVERING ARTICLES TO DELIVERY LOCATIONS THEREIN

(75) Inventor: Peter Berdelle-Hilge, Constance (DE)

(73) Assignee: Siemens Aktiengesellschaft, Munich (DE)

( * ) Notice: Subject to any disclaimer, the term of this patent is extended or adjusted under 35 U.S.C. 154(b) by 1684 days.

(21) Appl. No.: 10/933,452

(22) Filed: Sep. 3, 2004

(65) Prior Publication Data

US 2009/0272623 A1 Nov. 5, 2009

Related U.S. Application Data

(60) Provisional application No. 60/499,612, filed on Sep. 3, 2003.

(51) Int. Cl.
*B65G 15/58* (2006.01)

(52) U.S. Cl. .............................. 198/468.6; 198/370.01; 198/572; 198/575

(58) Field of Classification Search ................. 700/214, 700/215, 225, 226, 228, 230; 198/341.01, 198/349, 349.6, 370.01, 468.6, 468.8, 575, 198/572, 617; 414/277, 809; 209/584, 900
See application file for complete search history.

(56) References Cited

U.S. PATENT DOCUMENTS 3,782,565 A * 1/1974 Doran et al. ................ 414/274
3,884,370 A * 5/1975 Bradshaw et al. ........... 198/350
4,503,977 A * 3/1985 Kohno et al. ............... 209/564
4,773,807 A * 9/1988 Kroll et al. .................. 414/282
5,051,914 A * 9/1991 Sansone et al. ............. 700/223
5,154,246 A * 10/1992 DiGiulio et al. .......... 177/25.15
5,379,229 A * 1/1995 Parsons et al. .............. 700/215
5,385,243 A * 1/1995 Jackson et al. .............. 209/509
5,419,457 A * 5/1995 Ross et al. .................. 209/616
5,422,821 A * 6/1995 Allen et al. ................. 700/219
5,865,434 A * 2/1999 Yamanaka .................. 271/296
5,959,868 A * 9/1999 Oppliger et al. ............. 700/226
6,240,335 B1 * 5/2001 Wehrung et al. ............ 700/230
6,276,509 B1 * 8/2001 Schuster et al. ........ 198/370.02
6,539,098 B1 * 3/2003 Baker et al. ................. 382/101
6,799,671 B1 * 10/2004 Sanchez Gomez ....... 198/349.5
7,004,396 B1 * 2/2006 Quine et al. ................ 235/475
7,197,376 B2 * 3/2007 Berdelle-Hilge ............ 700/226
7,251,544 B2 * 7/2007 Christie, Jr. ................. 700/214

* cited by examiner

*Primary Examiner*—Douglas A Hess
(74) *Attorney, Agent, or Firm*—Laurence A. Greenberg; Werner H. Stemer; Ralph E. Locher

(57) ABSTRACT

A mail processing system that delivers articles to delivery locations includes a predetermined number of casing towers arranged in parallel, wherein each casing tower has a plurality of slots to receive articles. A transport system is associated with the casing towers and configured to guide at least one transport vehicle loaded with an article along a delivery path towards a delivery location. At least one elevator device is coupled to the transport system and configured to receive the transport vehicle at a first level and to index the elevator device to move the transport vehicle from the first level to a second level, where the transport vehicle exits the elevator device to travel along the delivery path.

9 Claims, 6 Drawing Sheets

MAIL PROCESSING SYSTEM AND METHOD OF DELIVERING ARTICLES TO DELIVERY LOCATIONS THEREIN

CROSS REFERENCE TO RELATED APPLICATIONS

The present application claims priority to provisional patent application Ser. No. 60/499,612 filed on Sep. 3, 2004, which is herein incorporated by reference.

BACKGROUND OF THE INVENTION

The various embodiments described herein relate to a mail processing system and a method of delivering articles to delivery locations within the mail processing system.

Each day the United States Postal Service (USPS) processes articles for delivery to millions of individual domestic addresses. As used throughout the application, articles refer to mail items, magazines, books and other such flat items. Before mail carriers begin to walk through or drive through their delivery routes, a mail processing system at a USPS processing site sorts all articles for the carriers and packages the sorted articles for each domestic address. A carrier's responsibility includes putting all of these articles into an appropriate sequence for efficient delivery to the domestic addresses.

The mail processing system is highly automated to handle the amount of daily articles. It includes a delivery point packaging (DPP) system that, for example, separates the articles, reads their destination addresses and groups the articles based upon their respective destination addresses. One example of a DPP system includes an arrangement of a multitude of individual pockets or slots for individual articles. A transport system transports the articles along a track system to the slots. Feeders insert the articles into the transport system at loading points. At this point, the destination address of a article is known and the transport system transports the article along a delivery path to a slot that is pre-assigned to the destination address of that article.

SUMMARY OF CERTAIN INVENTIVE ASPECTS

A general aspect of a mail processing system is to operate it as efficient and reliable as possible and as inexpensive as possible to the USPS. One parameter that influences efficiency, reliability, and operating costs is the number of vehicles traveling within the DPP system. Reducing the number of traveling vehicles improves efficiency and reliability and reduces operating cost. It is therefore, an objective to provide a mail processing system that allows operation with a reduced number of vehicles.

Accordingly, one aspect involves a method of delivering articles to predetermined delivery locations within a mail processing system. The method guides a transport vehicle loaded with an article along a delivery path towards a delivery location. The transport vehicle is guided to an elevator device to board the elevator device at a first level. The method indexes the elevator device to move the transport vehicle from the first level to a second level and guides the transport vehicle out of the elevator device at the second level to travel along the delivery path.

Another aspect involves a mail processing system having a predetermined number of casing towers arranged in parallel, wherein each casing tower has a plurality of slots to receive articles. A transport system is associated with the casing towers and configured to guide at least one transport vehicle loaded with an article along a delivery path towards a delivery location. At least one elevator device is coupled to the transport system and configured to receive the transport vehicle at a first level and to index the elevator device to move the transport vehicle from the first level to a second level, where the transport vehicle exits the elevator device to travel along the delivery path.

A further aspect involves a mail processing system having a predetermined number of casing towers arranged in parallel, wherein each casing tower has a plurality of slots to receive articles. A transport system is associated with the casing towers and configured to guide at least one transport vehicle loaded with an article along a delivery path towards a delivery location. At least one elevator device is coupled to the transport system and configured as a paternoster elevator. The elevator device is further configured to receive the transport vehicle at a first level and to index the elevator device to move the transport vehicle from the first level to a second level, where the transport vehicle exits the elevator device to travel along the delivery path.

BRIEF DESCRIPTION OF THE DRAWINGS

These and other aspects, advantages and novel features of the embodiments described herein will become apparent upon reading the following detailed description and upon reference to the accompanying drawings. In the drawings, same elements have the same reference numerals.

DETAILED DESCRIPTION OF CERTAIN INVENTIVE EMBODIMENTS

Figure 1:
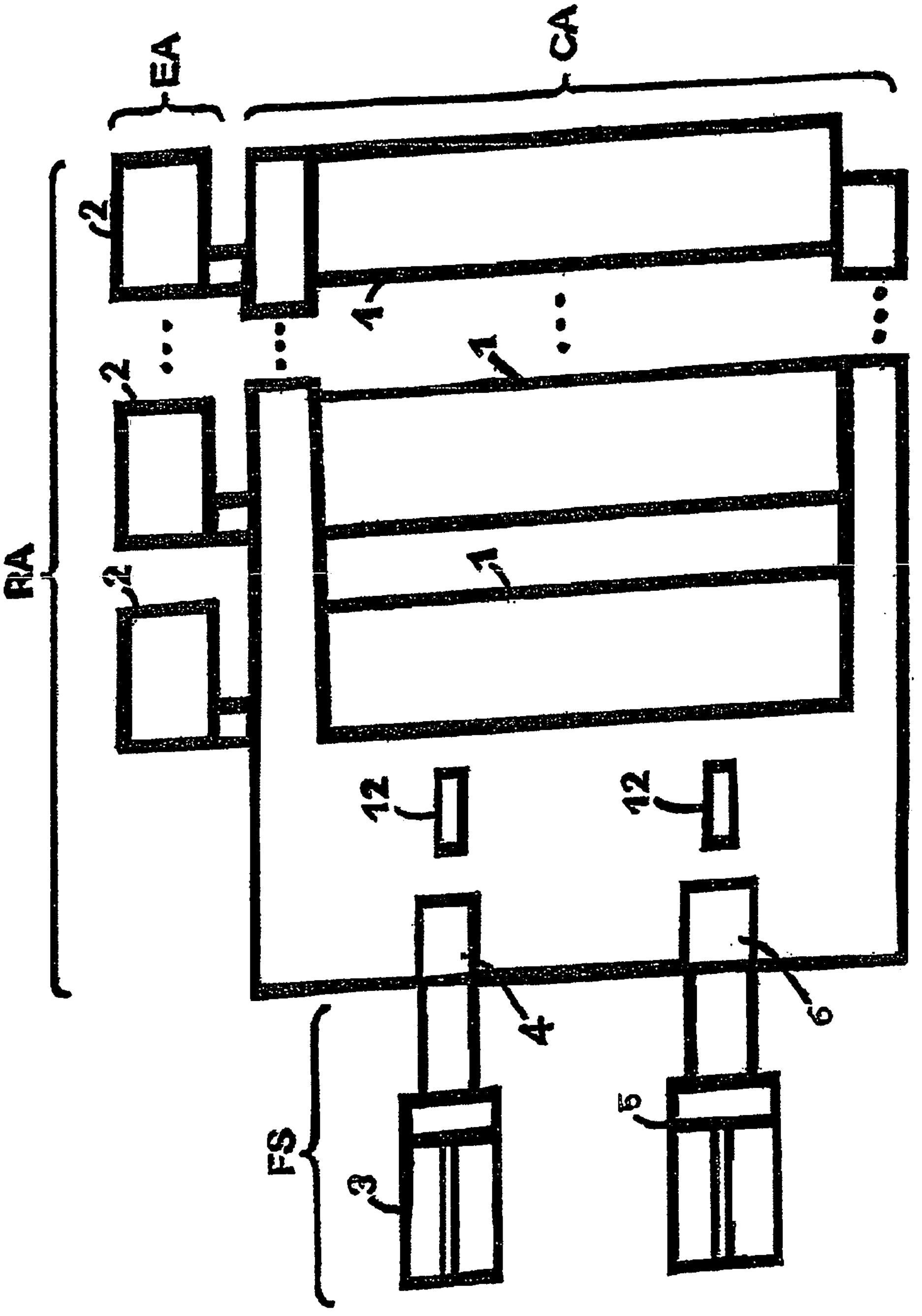
FIG. 1 shows a schematic overview of one embodiment of a mail processing system.

FIG. 1 shows a schematic illustration of one embodiment of a mail processing system to provide for a general overview of a mail processing system. The illustration depicts basic flows and functional relationships within the system. These basic flows and functional relationships are represented in FIG. 1 through functional blocks for a feeding section FS, a routing area RA, a casing area CA and an extraction area EA. These functional blocks represent some of the main functional features of the system. Those of ordinary skill in the art of mail processing systems will appreciate that the system includes a variety of other functional features. Further, it is contemplated that the separation into these functional blocks is arbitrary and that the blocks may be shown in a different arrangement without affecting the principal operation of the system. A more detailed description of one embodiment of the system and its structural components follows.

Briefly, the feeding section FS separates individual articles from batches to identify their individual destination addresses. For that purpose, the feeding section TS includes in one embodiment feeders 3, 5 and optical character readers or bar code readers, or a combination of these readers. After successful identification of the destination addresses, the feeder section FS hands the articles to the routing area RA. The routing area RA includes an infrastructure that transports the articles according to their destination addresses to the casing area CA. The infrastructure includes, among other elements, elevators and transport vehicles 12, for example, automatic inserter transport vehicles, hereinafter referred to as ANT(s) 12. In one embodiment, the system may include several hundred ANTs 12. The casing area CA is embedded in the routing area TRA and includes a predetermined number of casing towers 1 that have slots for the articles. Each slot represents an individual destination address. Once the articles are delivered to the slots extraction and packaging modules 2 in the extraction area EA extract the articles from the slots and pack the articles on a per destination address basis.

Figure 2:
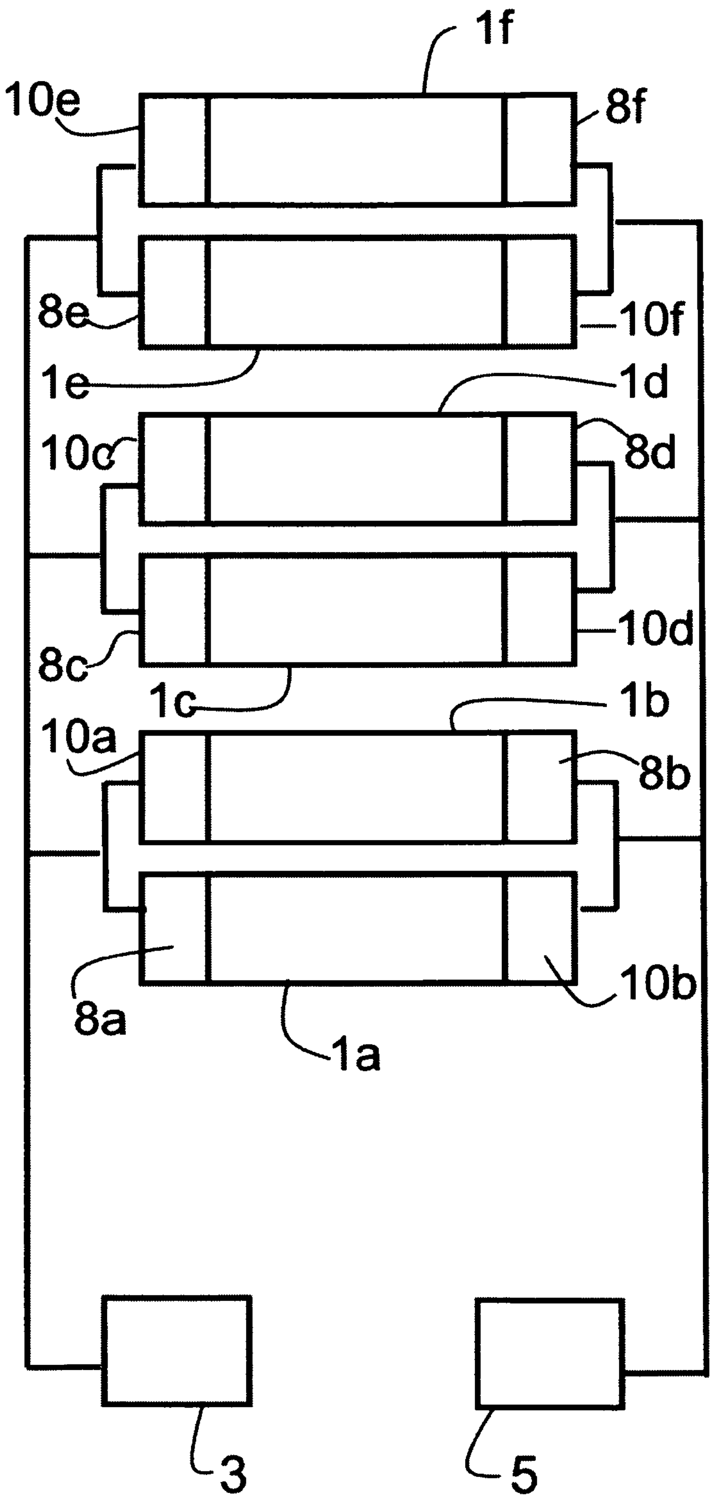
FIG. 2 illustrates a topology formed by loops.

The various embodiments of the mail processing system described hereinafter relate mainly to the feeder, routing and casing areas. FIG. 2 illustrates a topology that may be implemented within these areas of a mail processing system similar to the one shown in FIG. 1. The illustrated topology is based upon using casing towers 1*a*, 1*b*, 1*c*, 1*d*, 1*e*, 1*f*, two feeders 3, 5 and a transport system associated with the casing towers 1*a*, 1*b*, 1*c*, 1*d*, 1*e*, 1*f* and the feeders 3, 5. The topology includes three loops, i.e., per loop there are two casing towers 1*a*, 1*b*, 1*c*, 1*d*, 1*e*, 1*f* arranged in parallel, and the feeders 3, 5 located at different loading points and coupled to the loops.

Within each loop, the casing towers 1*a*, 1*b*, 1*c*, 1*d*, 1*e*, 1*f* having a predetermined number of available slots. For example, considering two casing towers 1*a*, 1*b* the available slots and, hence, the delivery addresses, are about equally divided between the two casing towers 1*a*, 1*b*. The casing tower 1*a* may comprise the first half of the delivery addresses and the casing tower 1*b* may comprise the second half of the delivery addresses.

Further, each loop includes merge elevators 8*a*, 8*b* and divert elevators 10*a*, 10*b*, wherein a divert elevator 10*a*, 10*b* is located at an entry side of a casing tower 1*a*, 1*b*, 1*c*, 1*d*, 1*e*, 1*f* and a merge-elevator 8*a*, 8*b* is located at an exit side of a casing tower 1*a*, 1*b*, 1*c*, 1*d*, 1*e*, 1*f*. The transport system couples the feeders 3, 5 to the loops to deliver the articles to the casing towers 1*a*, 1*b*, 1*c*, 1*d*, 1*e*, 1*f*. The transport system includes in one embodiment the ANTs 12, switches, re-circle lines and exception lines as described below.

For example, if the feeder 3 inserts an article for delivery to a designated slot within one of the casing towers 1*b*, 1*d*, 1*f* the ANT 12 travels along a rail system changing tracks via one or more of the switches and/or changing levels until it reaches the designated slot. In one embodiment, the empty ANT 12 returns to the feeder 5. Similarly, if the feeder 5 inserts an article for delivery to the designated slot within one of the casing towers 1*a*, 1*c*, 1*e* the ANT 12 travels along the rail system until it reaches its destination for delivery. The empty ANT 12 returns in one embodiment to the feeder 3.

The shown structures minimize the path lengths the ANTs 12 have to travel in order to reduce the number of ANTs 12 within the system. The number of ANTs 12 is determined with the following equation:

$$\#ANTs = (\text{Throughput} \times L_{path}) / V_{ANT},$$

wherein:

throughput is the number of mail pieces per time unit passing through the system, $L_{path}$ is the average path length for an ANT, and $V_{ANT}$ is the velocity of the ANTs.

Considering that the mail processing system may include several hundred ANTs 12; e.g. 400-700 ANTs, the objective is, for example, to determine the minimum number of ANTs 12 required in the system. The throughput is usually desired to be as high as possible and as such not a parameter that an operator reduces without need. One parameter that can be varied to influence the number of ANTs 12 is the path length $L_{path}$ an ANT 12 has to travel. The shorter the path length, the lower the number of required ANTs 12. Another parameter that can be varied within a certain range is the velocity of the ANTs 12. The faster the ANTs 12 travel, the lower the number of required ANTs 12. If the path lengths the ANTs 12 have to travel are optimized, the velocity of the ANTs 12 is an additional parameter for adjustment.

Figure 3:
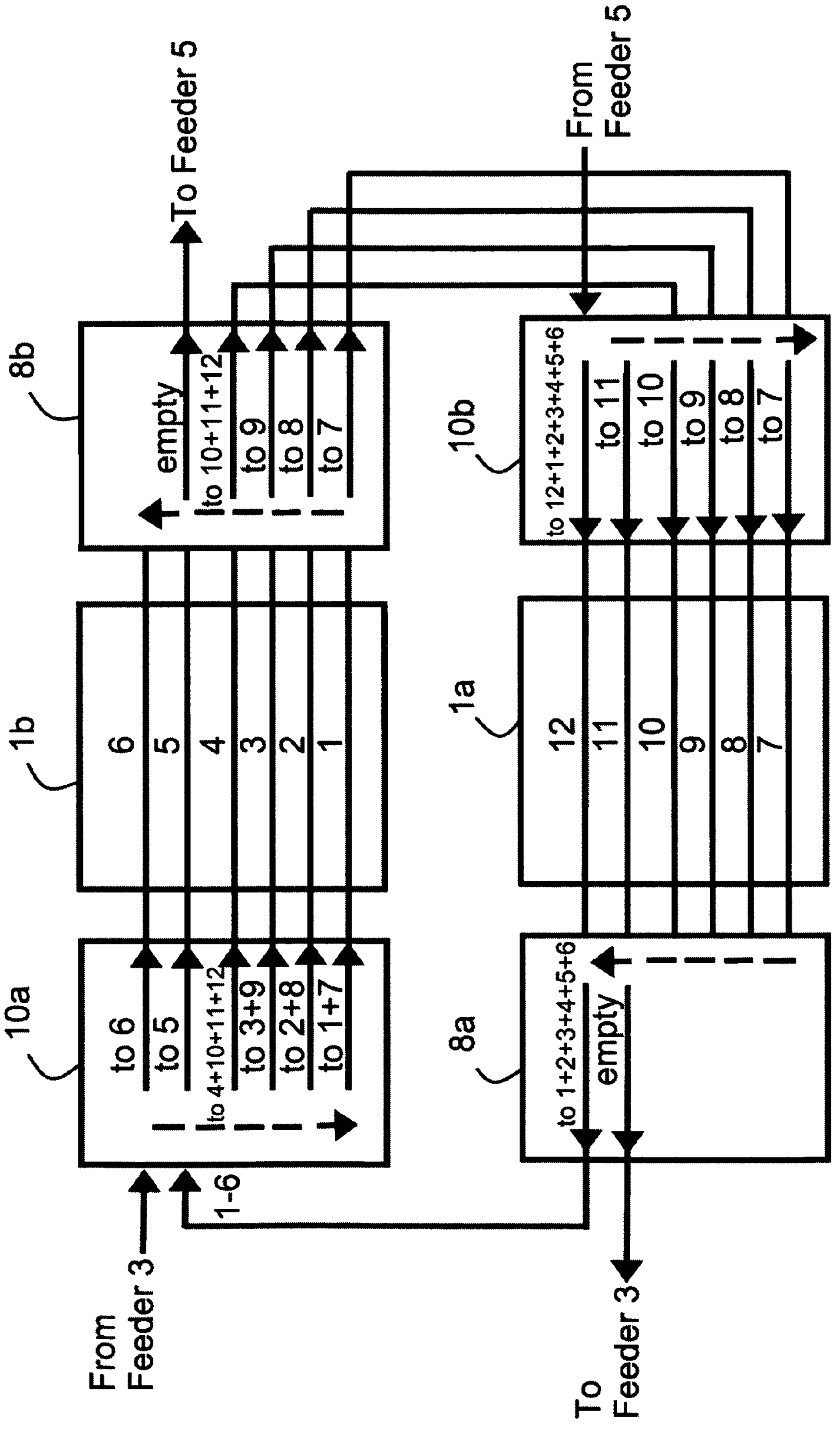
FIG. 3 illustrates one embodiment of a loop included in the structure shown in FIG. 2.

FIG. 3 illustrates one embodiment of a loop shown in FIG. 2 including the casing towers 1*a*, 1*b*, the divert elevators 10*a*, 10*b* and the merge elevators 8*a*, 8*b*. It is contemplated that FIG. 3 shows side views of the casing towers 1*a*, 1*b* and the elevators 8*a*, 8*b*, 10*a*, 10*b*. These elevators move vertically only one level per operation, wherein the divert elevators 10*a*, 10*b* generally move downwards, and the merge elevators 8*a*, 8*b* generally move upwards. It is contemplated that the elevators 8*a*, 8*b*, 10*a*, 10*b* may reverse the direction of movement, for example, if an ANT 12 enters a merge elevator 8*a*, 8*b* on level 2 and needs to go down to level 1. In that case, the generally upwards moving elevator reverses its direction. In operation, the ANTs 12 are queued in front of the elevators, and the divert elevators 10*a*, 10*b* receive the ANTs 12 from the feeders 3 and 5, respectively, wherein the ANTs 12 proceed from the merge elevators 8*a*, 8*b* to the feeders 3, 5, respectively, or the divert elevators 10*a*, 10*b*, respectively.

Each casing tower 1*a*, 1*b* has six levels. The illustrated loop, therefore, has twelve regions. For ease of description, all destinations (i.e., slots) within one region are identified in FIG. 4 by the number (1 to 12) of the region. For example, destination slot numbers 1 to 555 are located in region 1 (i.e., level 1 of casing tower 1*b*), destination slot numbers 556 to 1110 are located in region 2, and so on.

Referring initially to the divert elevator 10*a*, the ANTs 12 coming from the feeder 3 enter the divert elevator 10*a* on the $6^{th}$ level. The divert elevator 10*a* moves the ANTs 12 from the $6^{th}$ level down one level at a time. The ANTs 12 can have all slots of the casing tower 1*b* as destinations. If the destinations are within the casing tower 1*b* the ANTs 12 exit the divert elevator 10*a* at the assigned level and proceed to the designated slot within that level to deliver the article.

For example, assuming an ANT 12 enters the divert-elevator 10*a* on the $6^{th}$ level, if the ANT's 12 destination is in the region 6 it passes through without a vertical movement and another ANT 12 enters from level 6. If the destination is in another region, the ANT 12 is stopped in the divert elevator 10*a*. The divert elevator 10*a* indexes one level down. If any ANT 12 is in the divert elevator 10*a* that has reached its target level, this ANT 12 leaves the divert elevator 10*a*. A new ANT 12 enters on the $6^{th}$ level and the procedure is repeated. Further, if an ANT 12 from the feeder 3 has been delivered to level 5, a new ANT 12 is allowed to enter on level 5, e.g., coming from the merge elevator 8*a*, while the other ANT 12 exits to region 5. If the new ANT 12 does not have to go up to level 6, an ANT 12 from the feeder 3 can enter the divert elevator 10*a* in parallel on level 6. Depending on the throughput of the divert elevator 10*a* on level 5 there may be times when no ANT 12 is allowed to enter on level 6 and a gap is generated on level 5 by indexing the divert elevator 10*a* downward twice.

In FIG. 3, the feeder 3 loaded the ANTs 12 with articles for twelve regions. Those ANTs 12 delivering articles to the regions 1-6 within the casing tower 1*b* exit the divert elevator 10*a* at the appropriate level and deliver these articles. The empty ANTs 12 enter the merge elevator 8*b*. If the destinations are not within the casing tower 1*b*, certain levels are used for transferring the ANTs 12. All ANTs 12 going to region 10, 11 and 12 are put on level A. The ANT 12 for region 9 is put to level 3, the ANT 12 for region 8 on level 2 and the ANT 12 for region 7 on level 1 within the casing tower 1*b*. Under certain circumstances, ANTs 12 for regions 11 and 12 may not only be deployed to level 4, but to levels 1-3 as well, for example, if level 4 is blocked or is getting busy.

The ANTs 12 coming from the feeder 5 via the merge elevator 8*a*, i.e., those ANTs 12 with destinations in the regions 1-6 of the casing tower 1*b* and as such not emptied within the casing tower 1*a*, enter the divert elevator 10*a* on the 5$^{th}$ level and proceed to the corresponding levels 1 to 6. Under certain circumstances, e.g., for balancing reasons, empty ANTs 12 may enter on level 5. These empty ANTs 12 stay on level 5 and pass the divert elevator 10*a* without a vertical move if that level is not blocked or busy. If an ANT 12 enters the divert elevator 10*a* on level 6 and does not have a final destination address (no read), the ANT 12 is assigned to a level.

Referring to the merge elevator 8*b*, the ANTs 12 coming from the levels 5 and 6 of the casing tower 1*b* are empty. The empty ANTs 12 are transferred to level 5 and leave the merge elevator 8*b* to be re-loaded at the feeder 5. The ANTs 12 coming from the other levels 1-4 are empty if their destinations were within the levels 1-4. In that case, these ANTs 12 are transferred to level 5 as well to leave the merge elevator 8*b* for the feeder 5. Full ANTs 12 from the levels 1-4 (i.e., ANTs 12 with destinations in the regions 7-12) pass the merge elevator 8*b* without a vertical move and proceed to the divert elevator 10*b*. Under certain circumstances, empty ANTs 12 may proceed to the feeder 3. These ANTs 12 are transferred to the level 4 or to levels 3-1.

If an ANT 12 transports a "no read" article, this ANT 12 obtains its final target destination before entering the merge elevator 8*b*. If the final target destination is outside the loop the ANT 12 leaves the merge elevator 8*b* on level 5. If it is within the following casing tower, e.g., casing tower 1*a*, the ANT 12 proceeds as described. If the ANT 12 has to go back to the other casing tower, e.g., casing tower 1*b*, the ANT 12 is assigned to a level that leads, for example, to the divert elevator 10*a*.

Referring to the divert elevator 10*b*, the ANTs 12 from the feeder 5 enter the divert elevator 10*b* on level 6. If the destination of an ANT 12 is one of the regions 7-12 the ANT 12 is transferred to the corresponding level of the casing tower 1*a*. If the destination is within the regions 1-6 of the casing tower 1*b* the ANT 12 can pass the divert elevator 10*b* without a vertical movement on level 6. Under certain circumstances, the 6$^{th}$ level may be blocked or get busy. In that case, the ANTs 12 may use the 5$^{th}$ level and the other levels.

The ANTs 12 coming from the merge elevator 8*b* on levels 1-3 have destinations for the regions on the same levels (i.e., 1-3), enter the divert elevator 10*b* and pass the divert elevator 10*b* without vertical movement. The ANTs 12 entering on the 4$^{th}$ level proceed in a similar manner if the ANTs 12 have destinations for the region 10. If the ANTs 12 have destinations in the regions 11 or 12, the ANTs 12 are transferred vertically to the proper levels 5 or 6. If an ANT 12 enters the divert elevator 10*b* on level 6 and does not have a final destination address ("no read"), the ANT 12 is assigned to a level.

Referring to the merge elevator 8*a*, all empty ANTs 12 are to be transferred to level 5 where they leave the merge elevator 8*a* for the feeder 3. Under certain circumstances, some ANTs 12 may proceed to the feeder 5. In that case, those ANTs 12 are moved to level 6. All loaded ANTs 12, which have destinations in regions 1 to 6 only, are transferred to the level 6 for delivery via the divert elevator 10*a*. If an ANT 12 has a "no read" article, this ANT 12 obtains its final target destination before entering the merge elevator 8*a*. If the final target destination is outside the loop the ANT 12 leaves the merge elevator 8*a* on level 5, otherwise that ANT 12 is transferred to level 6.

Figure 4:
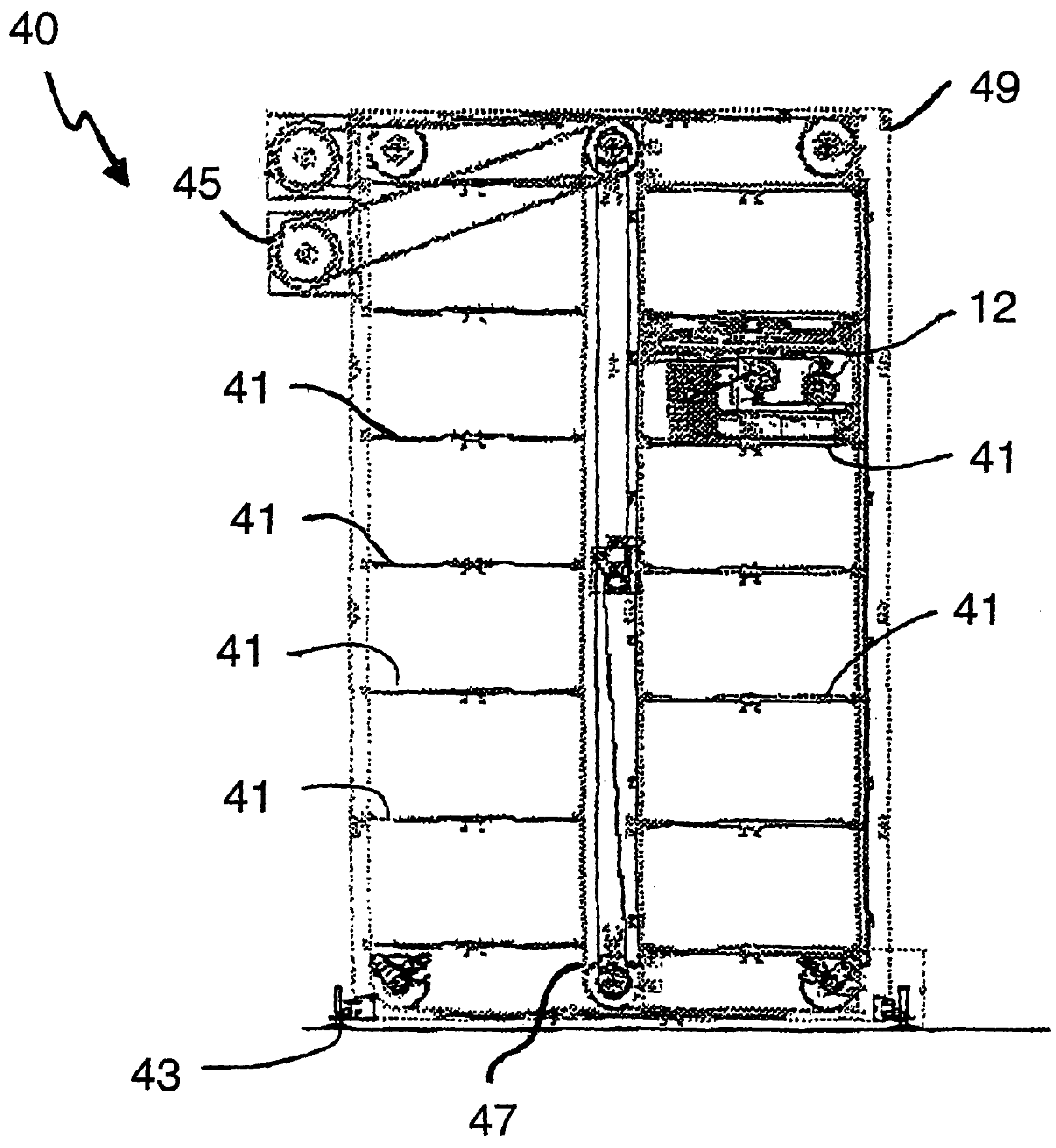
FIG. 4 illustrates one embodiment of an elevator used within a mail processing system.

FIG. 4 shows an embodiment of an elevator installation 40 that may be used in a system according to FIG. 2. The illustrated elevator installation 40 functions similar to an elevator know as "paternoster elevator." Such an elevator has a number of platforms that move along a closed loop. For example, in a building a paternoster elevator moves up on one side and down on the other side. The movement of such an elevator is continuous and passengers board and leave the elevator while the elevator continues to move.

Accordingly, the elevator installation 40 includes a support structure 49 that rests on a base element 43. The support structure 49 houses, among other elements, a number of trays 41 and a power train system 45, 47. The trays 41 are coupled to the power train system 45, 47 that drives and guides the trays 41 along a closed vertical loop. A part of the power train system 47 divides the elevator installation 40 in a left side and a right side that are connected at the top and bottom of the elevator installation 40. The trays 41 on either part move in opposite directions. For example, the trays 41 on the left side move up, whereas the trays 41 on the right side move down, or vice versa. For illustrative purposes, the embodiment of FIG. 4 shows an ANT 12 hanging on one of the trays 41 on the right side.

In one embodiment, the elevator installation 40 is configured so that there are six trays 41 on each side, as shown in FIG. 4. Hence, the trays 41 on one side can serve the six levels of the casing towers, and the ANTs 12 can board from the casing towers or exit to the casing towers. It is contemplated that an input line is assigned to each tray 41 so that the ANTs 12 may enter or exit the elevator installation 40 at each level. Further, it is contemplated that the elevator installation 40 at a given time transports several ANTs 12 that may enter and leave under their own control. The power train system 45, 47 operates the elevator installation 40 on a step-by-step basis so that each tray 41 moves up or down one step at a time. Each time an ANT 12 wants to board or exit, the power train system 45, 47 stops moving the trays 41.

Further, if only one side of the elevator installation 40 is used (e.g., FIG. 5), the elevator installation 40 may operate as a merge elevator or a divert elevator. In one embodiment (e.g., FIG. 6), both sides of the elevator are used. The elevator installation 40 operates then as a merge and divert elevator.

In the illustrated embodiment, the elevator is a lateral paternoster. However, those of ordinary skill in the art will appreciate that in another embodiment the elevator is Ferris wheel paternoster elevator. Note, however, that the step-by-step operation is independent of whether a lateral or Ferris wheel paternoster elevator is used.

Figure 5:
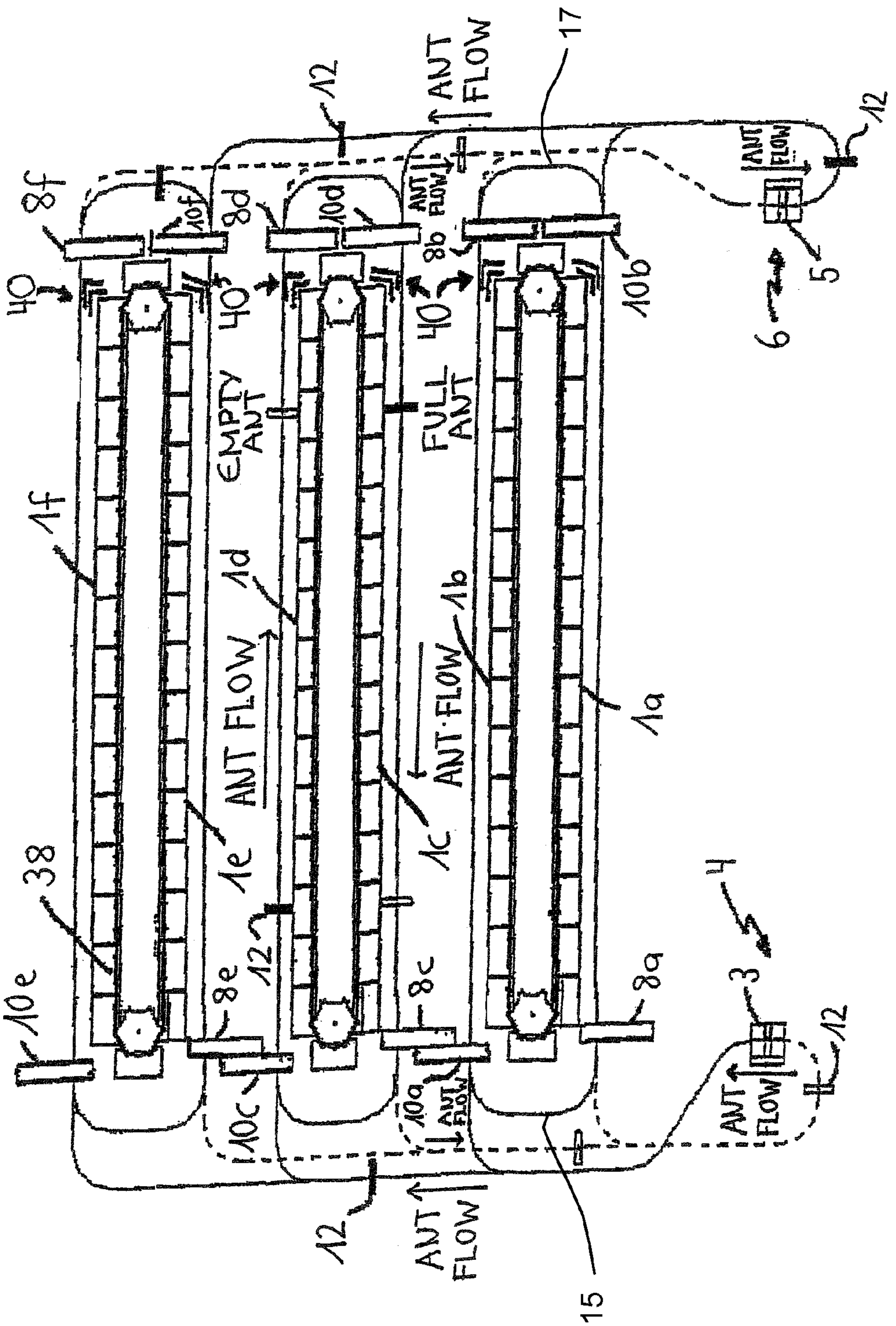
FIG. 5 illustrates a first embodiment of a schematic mail processing system.

FIG. 5 illustrates a first embodiment of a schematic mail processing system. The illustrated embodiment of the system includes the casing tower arrangement 1*a*, 1*b*, 1*c*, 1*d*, 1*e*, 1*f*, ANTs 12, merge elevators 8*a*, 8*b*, 8*c*, 8*d*, 8*e*, 8*f* each assigned to a respective casing tower 1*a*-1*f*, and divert elevators 10*a*, 10*b*, 10*c*, 10*d*, 10*e*, 10*f* each also assigned to a respective casing tower arrangement 1*a*-1*f*. The merge elevators 8*a*-8*f* and the divert elevators 10*a*-10*f* may each be implemented through an elevator installation 40, as shown in FIG. 4. The system includes further by-passes 15, 17, switches that allow an ANT 12 to change tracks, ramp devices that allow an ANT 12 to change levels. In one embodiment, the by-passes 15, 17 include ramp devices. A track system interconnects these elements of the system as described below in connection with a description of the operation of the system.

Note that FIG. 5 shows a top view of the casing towers 1*a*-1*f* so that various sections 38 with containers are visible. It is contemplated that each casing tower 1*a*-1*f* has several levels (e.g., level 1 . . . level 6). For ease of Illustration, FIG. 5 indicates these levels only in an area 40 of the illustrated casing towers 1*a*-1*f*. It is contemplated, however, that each level has a substantially identical structure.

The feeder 3 loads an ANT 12 with a single article at the loading point 4. Note that FIG. 5, as well as the following drawing, shows a loaded ANT 12 for Illustrative purposes as a filled rectangle and an empty or unloaded ANT 12 as an unfilled rectangle. The ANT 12 is moved to level 6 and distributed through switches to one of the three loops depending on the destination of the article contained in the ANT 12. The ANT 12 proceeds to one of the divert elevators 10*a*, 10*c*, 10*e* to enter the casing tower 1*b*, 1*d* or 1*f* on the 6$^{th}$ level. The ANT 12 proceeds then to the six levels in the casing tower 1*b*, 1*d* or 1*f*. When the ANT 12 reaches one of the merge elevators 8*b*, 8*d*, 8*f* the ANT 12 is empty if the destination address was within the casing towers 1*b*, 1*d*, 1*f* the ANT 12 passed. The ANT 12 leaves the loop through the merge elevator 8*b*, 8*d*, 8*f* on the 5$^{th}$ level and proceeds to the loading point 6. If the ANT 12 is not empty, the ANT 12 proceeds via the by-pass 17 to one of the divert elevators 10*b*, 10*d*, 10*f* and enters one of the casing towers 1*a*, 1*c*, 1*e*. Once the ANT 12 reaches one of the merge elevators 8*a*, 8*c*, 8*e* the ANT 12 should be empty and leaves the loop via the 5$^{th}$ level of the merge elevator 8*a*, 8*c*, 8*e*. The ANT 12 proceeds via switches and one or more ramps to the loading point 4.

Similar to the feeder 3, the feeder 5 at the loading point 6 loads an ANT 12 with a single article. The ANT 12 is moved to level 6 and distributed to one of the three loops depending on the destination address of the article contained on the ANT 12. The ANT 12 proceeds to one of the divert elevators 10*b*, 10*d*, 10*f* on the 6$^{th}$ level. The ANT 12 proceeds then to the six levels in the casing tower 1*a*, 1*c*, 1*e*. When the ANT 12 reaches one of the merge elevators 8*a*, 8*c*, 8*e* the ANT 12 is empty if the destination address was within the casing tower 1*a*, 1*c*, 1*e* passed and leaves the loop through the merge elevator 8*a*, 8*c*, 8*e* on the 5$^{th}$ level. The ANT 12 proceeds to the loading point 4. If the ANT 12 is not empty, the ANT 12 proceeds via the by-pass 15 to one of the divert elevators 10*a*, 10*c*, 10*e* and enters one of the casing towers 1*b*, 1*d*, 1*f*. Once the ANT 12 reaches one of the merge elevators 8*b*, 8*d*, 8*f* the ANT 12 should be empty and leaves the loop via the 5$^{th}$ level of the merge elevator 8*b*, 8*d*, 8*f*. The ANT 12 proceeds to the loading point 6.

Figure 6:
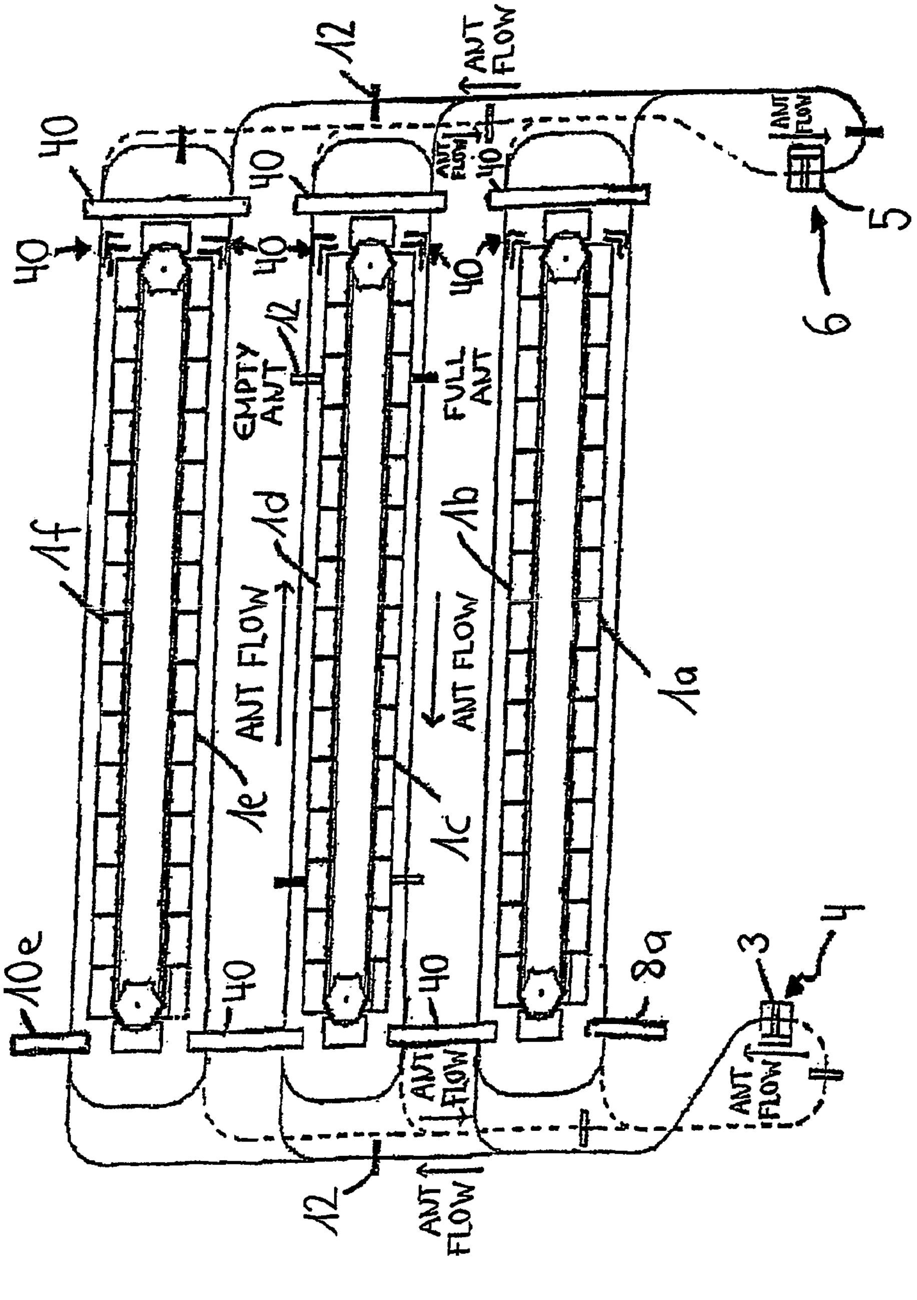
FIG. 6 illustrates a second embodiment of a schematic mail processing system.

FIG. 6 illustrates one embodiment of a schematic mail processing system. The embodiment of FIG. 6 corresponds generally to the structure of the embodiment of FIG. 5. However, elevator installations 40 are used to implement both merge elevators and a divert elevators. For example, the elevators 10*a*, 8*c*; 10*b*, 8*b*; 10*c*, 8*e*; 10*d*, 8*d*; and 10*f*, 8*f* are each implemented by one elevator installation 40 that operates as described above with reference to FIG. 4.

It is contemplated that inserting and guiding the articles occurs in one embodiment asynchronously. That is, each feeder 3, 5 loads the ANTs 12 at its own operational speed, and the ANTs 12 begin traveling along their delivery paths as soon as the articles are loaded. Each ANT 12 according to one embodiment is an independent vehicle with its own controller so that the ANT 12 knows, for example, how to travel and when to wait for another ANT 12.

Within such a system, the delivery paths are optimized in that the lengths of the paths the ANTs 12 have to travel is minimized. As a result of the minimized path lengths the number of ANTs 12 within the system can be reduced. The reduced number of ANTs 12, in turn, leads to improved efficiency, availability and reliability (e.g., improved mean-time between failure, MTBF) and to reduced operating costs. Further, such a system requires only two levels for the track path.

As indicated above, the ANT 12 is autonomous vehicle designed to carry one article from one of two loading points and deliver it to one of many delivery point slots. To perform this task the ANT 12 includes communications equipment that provides for communications between the ANT 12 and the system acting as a host. The transport system moves the ANTs 12 within the mail processing system. Within the transport system the ANTs 12 travel on a track system. In one embodiment, the track system is based on a monorail that serves as a railway for the ANTs 12. The track system includes switches that allow the ANTs 12 to change from one rail path to another. For example, as the ANT 12 approaches a switch it sends a signal to the switch that indicates the desired direction. The switch "knows" its own switch position, processes the indicated direction and changes its switch position, if necessary, to divert the ANT 12 to the appropriate rail.

The transport system includes further the divert elevators 10*a*, 10*b*, 10*c*, 10*d*. Each divert elevator moves an ANT 12 to one of the levels of the casing tower arrangements 1*a*, 1*b*, 1*c*, 1*d* so that the ANT 12 can make a delivery to one of the destination slots. Similar to the switches/the ANT 12 approaches an elevator and signals its destination level. The ANT 12 has to wait to board the elevator. Once the ANT 12 is on board, the elevator indexes vertically one level and stops to allow other ANTs 12 to board or exit as necessary. In one embodiment, the elevator moves up, except when an ANT 12 enters on level 2 or 3 and needs to go down to level 1 or 2.

In addition, the transport system includes the merge elevators 8*a*, 8*b*, 8*c*, 8*d*. After delivering the articles, the ANTs 12 accumulate at the exit of the casing tower arrangements 1*a*, 1*b*, 1*c*, 1*d*. At this point, all ANTs 12 have the same destination, i.e., to get back to the feeder section. In one embodiment, each merge elevator accepts up to four ANTs 12 per level and indexes up. At levels 5 and 6 of the casing tower arrangements 1*a*, 1*b*, 1*c*, 1*d* the ANTs 12 are instructed to exit.

It is apparent that there has been disclosed a mail processing system and a method of delivering articles to predetermined delivery locations within the mail processing system that fully satisfies the objects, means, and advantages set forth hereinbefore. While specific embodiments of the system and method have been described, it is evident that many alternatives, modifications, and variations will be apparent to those skilled in the art in light of the foregoing description.

The invention claimed is:

1. A mail processing system, comprising:

a first casing tower and a second casing tower arranged in parallel, the first casing tower having a first group of levels and a first group of slots to receive articles, and the second casing tower having a second group of levels and a second group of slots to receive articles;

a transport system associated with the casing towers and configured to guide at least one transport vehicle loaded with an article along a delivery path towards a delivery location;

wherein the first and second casing towers are parts of the same loop, said loop further including a first divert elevator and a first merge elevator, said elevators being configured to receive the transport vehicle at a first level and to index the elevator device to move the transport vehicle from the first level to a second level, where the transport vehicle exits the elevator device to travel along the delivery path;

wherein said first divert elevator is located at an entry side of the first casing tower and the first merge elevator is located at an exit side of the first casing tower;

wherein transport vehicles delivering articles to slots within the first casing tower exit the first divert elevator at the appropriate level of the first casing tower and deliver these articles to slots of the first casing tower; and wherein the first casing tower further comprises at least one level for transferring transport vehicles from the first divert elevator to the first merge elevator if the destination of the transport vehicle is not within the first casing tower, the first merge elevator being connected to the second casing tower and adapted to transfer those transport vehicles to the second casing tower.

2. The system of claim 1, wherein the elevator device includes trays that move in a vertical direction along a closed loop.

3. The system of claim 1, wherein the elevator device moves the transport vehicle upwards.

4. The system of claim 1, wherein the elevator device moves the transport vehicle downwards.

5. The system of claim 1, wherein the elevator device moves the transport vehicle upwards, while it moves another transport vehicle downwards.

6. The system of claim 1, wherein at least one elevator is configured as a paternoster elevator.

7. The system of claim 1, further comprising:

a second divert elevator, a second merge elevator and a plurality of transport vehicles;

the second casing tower having an entry side, an exit side, and slots;

the second divert elevator located at the entry side of the second casing tower;

the second merge elevator located at the exit side of the second casing tower; and wherein the plurality of transport vehicles exit the second divert elevator at an appropriate level of the second casing tower and deliver the articles to the slots of the second casing tower.

8. The system of claim 7, wherein:

the second casing tower further includes at least one level for transferring at least one of the plurality of transport vehicles from the second divert elevator to the second merge elevator if a destination of the one of the plurality of transport vehicle is not within the second casing tower; and the second merge elevator is connected to the first divert elevator.

9. The system of claim 8, wherein the first merge elevator is connected to the second divert elevator.

* * * * *